United States Patent [19]

Polch et al.

[11] Patent Number: 5,533,811
[45] Date of Patent: Jul. 9, 1996

[54] HYDRODYNAMIC BEARING HAVING INVERTED SURFACE TENSION SEALS

[75] Inventors: Ewaryst Z. Polch, Monument; Carl D. Williams; Jackie Cordova, both of Colorado Springs, all of Colo.

[73] Assignee: Quantum Corporation, Milpitas, Calif.

[21] Appl. No.: 388,380

[22] Filed: Feb. 14, 1995

[51] Int. Cl.$^6$ ................................................ F16C 33/72
[52] U.S. Cl. ........................ 384/107; 384/130; 384/477
[58] Field of Search .................................. 384/107, 130, 384/477, 112, 113, 123

[56] References Cited

U.S. PATENT DOCUMENTS

| | | | |
|---|---|---|---|
| 4,795,275 | 1/1989 | Titcomb et al. | 384/107 |
| 5,067,528 | 11/1991 | Titcomb et al. | 141/4 |
| 5,112,142 | 5/1992 | Titcomb et al. | 384/107 |
| 5,357,162 | 10/1994 | Aiyoshizawa et al. | 384/112 |
| 5,357,163 | 10/1994 | Minakuchi et al. | 384/112 |
| 5,407,281 | 4/1995 | Chen | 384/107 |
| 5,423,612 | 6/1995 | Zang et al. | 384/119 |
| 5,448,120 | 9/1995 | Schaule et al. | 310/90 |

Primary Examiner—Lenard A. Footland
Attorney, Agent, or Firm—David B. Harrison; William J. Kubida

[57] ABSTRACT

An improved hydrodynamic bearing comprising a longitudinally extending sleeve and an elongated shaft with the shaft being disposed within the sleeve for rotation relative thereto. A first thrust plate is coupled to one end of the shaft and a second thrust plate is coupled to the opposite end. A lubricant is disposed between the shaft and the sleeve as well as between the first and second thrust plates and the sleeve. The first thrust plate extends radially outward adjoining a corresponding first end of the sleeve forming a gap for containing the lubricant therebetween and the first thrust plate further extends axially inward toward a center of the bearing along an outer surface of the sleeve defining a surface tension seal forming gap therebetween. In a particular embodiment, the surface tension seal forming gap may be tapered to grow wider as it extends axially inward toward the center of the bearing to form a surface tension seal. The inverted surface tension seal configuration allows for an increased distance between the centers of force acting at the upper and lower bearing journals, thereby resulting in an enhanced tilt stiffness.

54 Claims, 4 Drawing Sheets

5,533,811

HYDRODYNAMIC BEARING HAVING INVERTED SURFACE TENSION SEALS

CROSS REFERENCE TO RELATED PATENTS

The present invention is related to the subject matter of U.S. Pat. No. : 4,795,275 for "Hydrodynamic Bearing issued Jan. 3, 1989; U.S. Pat. No. 5,067,528 for "Hydrodynamic Bearing" issued Nov. 26, 1991; and U.S. Pat. No. 5,112,142 for "Hydrodynamic Bearing" issued May 12, 1992, all issuing to Digital Equipment Corporation and now assigned to Quantum corporation, Milpitas, Calif., assignee of the present invention, the disclosures of which are hereby specifically incorporated by this reference.

BACKGROUND OF THE INVENTION

The present invention relates, in general, to the field of hydrodynamic bearings. More particularly, the present invention relates to a hydrodynamic bearing configuration utilizing one or more inverted surface tension seals which is of particular utility in conjunction with the rotating hub and disk stack of a computer mass storage device disk drive. The hydrodynamic bearing of the present invention provides enhanced tilt stiffness during rotation of the disk stack by allowing for an increased distance between the centers of force acting at the upper and lower bearing journals, thereby resulting in an effectively greater spindle length for a given height form factor disk drive.

Disk drives are computer mass storage devices from which data may be read and/or to which such data may be written. In general, they comprise one or more randomly accessible rotating storage media, or disks, on which data is encoded by various means. In magnetic disk drives, data is encoded as bits of information comprising magnetic field reversals grouped in tracks on the magnetically-hard surface of the rotating disks. The disks are stacked in a generally parallel and spaced-apart relationship and affixed at their inner diameter ("ID") to a common hub which is rotationally coupled to a stationary spindle shaft by a pair of bearings, typically ball bearings.

With the growing trend toward even lower height form factor disk drives, the length of the spindle shaft and spacing between the upper and lower bearings becomes a significant consideration in meeting specific drive height constraints. As drive height is decreased, a proportionately shorter spindle must be accommodated within the decreased height constraints with a concomitantly shorter spacing available between the upper and lower bearings supporting the hub on the spindle.

Inasmuch as conventional ball bearings have inherently limited stiffness themselves and exhibit many spring-like properties, shorter spacing between the upper and lower bearings results in reduced tilt stiffness as well as a reduced rocking mode frequency. Given the various excitation frequencies in an operating disk drive, whether due to defects and imperfections in the races and ball bearings or other factors, reduced tilt stiffness and lower rocking mode frequency can cause drive failure if it becomes coincident with these excitation frequencies. In addition, the lubricant film thicknesses associated with ball bearings are very thin, providing little attenuation of surface defects and imperfections in the ball bearings. This results in large amounts of repetitive runout, or repetitive path deviation traced out by the spin axis of the spindle bearing. In addition, ball bearings may exert excessive force on the attached disk drive structure, leading to eventual structural damage.

The aforementioned United States patents describe a hydrodynamic bearing of particular utility in overcoming the inherent disadvantages of conventional ball bearing supported spindles. In particular, the design therein disclosed provides much improved runout characteristics over ball bearing designs due to its use of a relatively thick lubricant film between the sliding metal surfaces which simultaneously provides a high degree of viscous damping to significantly attenuate non-repetitive runout. As a result, increased tracking performance may be achieved allowing for enhanced drive track densities. Moreover, the lubricant film also serves to dampen external shock and vibration resulting in a more robust drive especially desirable in conjunction with portable computer equipment.

Nevertheless, the particular structure of the bearings disclosed in these patents extends the seals axially outward from the center of the bearing, in effect limiting the distance between the centers of force acting at the upper and lower bearing journals as dictated by the particular drive height form factor. The resultantly smaller distance between the centers of force, as with conventional ball bearing designs, limits the overall tilt stiffness of the bearing.

Consequently, a need remains in the art for a hydrodynamic bearing having improved tilt stiffness while retaining the advantages of high precision with low repetitive and non-repetitive runouts associated with conventional hydrodynamic bearing designs.

SUMMARY OF THE INVENTION

An object of the present invention is to provide a hydrodynamic bearing exhibiting improved tilt stiffness for a given height form factor disk drive without sacrificing journal bearing space. Moreover, the hydrodynamic bearing of the present invention allows for the inclusion of relatively larger thrust surfaces.

The bearing of the present invention is of the type having a shaft or journal which spins within a sleeve and has upper and lower thrust plates disposed at either end of the shaft, with a lubricant, such as oil, interposed between the shaft and the sleeve and between the thrust plates and the sleeve. Surface tension seals are formed between the thrust plates and the sleeve. The bearing of the present invention has the surface tension seal at one or both ends of the bearing inverted in direction, that is, extending axially toward the bearing center instead of axially away from the center, to allow the length between the bearing journals to be increased, thereby significantly improving the bearing tilt stiffness. The surface tension seal is reversed in direction by extending at least one of the thrust plates radially outward along the end of the sleeve and back in axially toward the center of the bearing, along the outer wall of the sleeve.

Disclosed herein is a hydrodynamic bearing which incorporates a central shaft and a sleeve having first and second ends and an inner and outer diameter thereof axially surrounding the central shaft at the sleeve's inner diameter. At least one thrust plate is coupled adjacent an end of the central shaft adjoining the first end of the sleeve, the thrust plate further presenting a portion thereof disposed adjoining the outer diameter of the sleeve extending toward the second end thereof to form a surface tension seal forming gap therebetween. A lubricant is disposed between the shaft and the inner diameter of the sleeve and between the first end of the sleeve and the thrust plate. The lubricant in the surface tension forming gap provides a surface tension seal.

In a more particular embodiment, a hydrodynamic bearing is disclosed comprising a longitudinally extending sleeve and an elongated shaft having first and second ends thereof, with the shaft being disposed within the sleeve for rotation relative thereto and vice versa. A first thrust plate is coupled to the first end of the shaft and a second thrust plate is coupled to the second end of the shaft. A lubricant is disposed between the shaft and the sleeve and between the first and second thrust plates and the sleeve. The first thrust plate extends radially outward adjoining a corresponding first end of the sleeve forming a gap for containing the lubricant therebetween and the first thrust plate further extends axially inward toward a center of the bearing along an outer surface of the sleeve forming a tapered gap therebetween. The tapered gap grows wider as it extends axially inward toward the center of the bearing to form a surface tension seal.

BRIEF DESCRIPTION OF THE DRAWINGS

The foregoing and other features and objects of the present invention will become more apparent and the invention itself will be best understood by reference to the following description of a preferred embodiment, taken in conjunction with the accompanying drawings, wherein.

DESCRIPTION OF A PREFERRED EMBODIMENT

Figure 1:
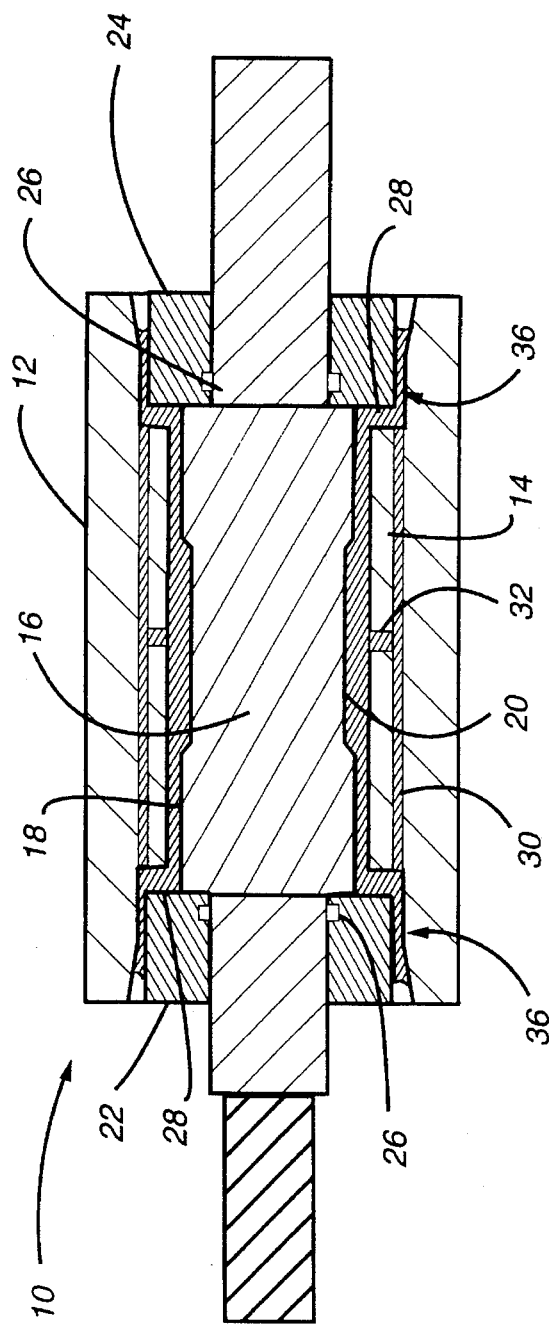
FIG. 1 illustrates a cross-sectional, side elevational view of a conventional hydrodynamic bearing utilizing surface tension seals as disclosed in the aforementioned United States Patents.

With reference to FIG. 1, a conventional hydrodynamic bearing 10 utilizing surface tension dynamic seals as disclosed and claimed in U.S. Pat. Nos.: 4,795,275; 5,067,528 and 5,112,142 is shown. A detailed description of the structure and function of the bearing 10 is provided therein and the disclosures thereof are incorporated by this reference. The following is a brief description of the bearing 10 provided herein for convenience and to facilitate understanding of the principles of the present invention as it relates to an improvement over conventional hydrodynamic bearing 10 designs.

Bearing 10 includes a sleeve 12 including a portion of smaller inside diameter 14. A journal or shaft 16 rotates within sleeve 12 although the sleeve 12 may be rotated about a stationary shaft 16 instead. Clearance spaces 18 (which, as an example only, may be between 0.0002 to 0.001 inches) and 28 (which also, as an example only, may be between 0.0005 and 0.002 inches and located between the smaller inside diameter 14 and journal 16) are filled with a lubricant such as oil through which hydrodynamic pressure is generated as journal 16 spins. Journal 16 may also include a recess 20 defining or separating the bearing journals.

Thrust plates 22 and 24 rotate along with journal 16. Thus, seals 26 are static seals which do not need to provide for relative motion. Seals 26 simply prevent lubricant leakage and may be conventional "O" ring seals for example. Axially extending passageways 30 and radially extending passageways 32 are arranged around the circumference of sleeve 12 and provide for pressure equalization between clearance spaces 36.

Dynamic seals are required in clearance spaces 36, because the thrust plates 22 and 24 rotate with respect to sleeve 12. Sealing is provided by surface tension capillary seals, shown in more detail in FIGS. 2 and 3.

Figure 2:
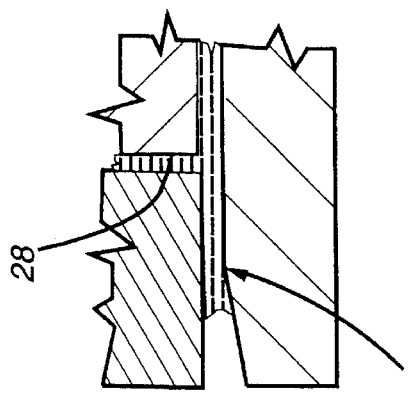
FIG. 2 is an expanded, detailed illustration of one of the surface tension seals of the hydrodynamic bearing of FIG. 1.

With reference additionally now to FIG. 2, an expanded detailed drawing of one of the surface tension seals within the spaces 36 is shown. In operation, lubricant within the clearance space 28 and passageway 30 moves into the tapered clearance space 36. It is prevented from moving further and leaking out by a careful balance between the surface tension of the lubricant, the relative pressures of the air and the lubricant, and the size and structure of clearance space 36.

Figure 3:
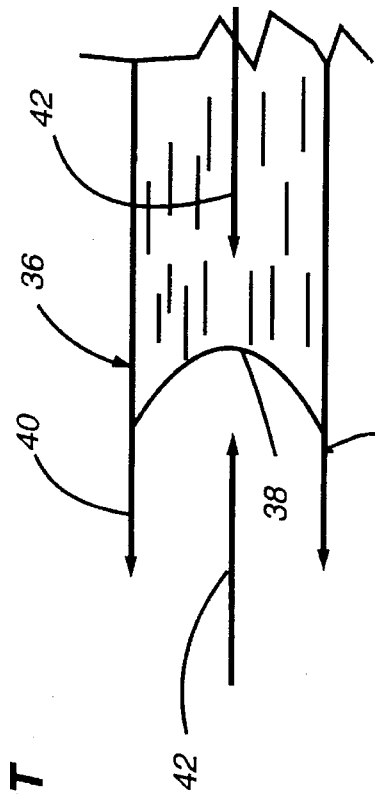
FIG. 3 is a further enlarged view of the surface tension seal of FIG. 2.

With further additional reference to FIG. 3, the surface tension seal of FIG. 2 is enlarged still further to illustrate this balance. Lubricant/air interface 38 has a characteristic surface tension depending upon the lubricant, indicated by arrows 40. The differential pressures of the air and the lubricant are indicated by arrows 42. The surface tension is determined by the location of the lubricant/air interface 38 inasmuch as it depends on the wetted perimeter of interface 38, (and clearance space 36 is tapered) resulting in different wetted perimeters at different points. Thus, the location of the interface 38 moves slightly with varying air and lubricant pressures until the forces come into balance. Gravitational forces are also accounted for in the overall design.

Figure 4:
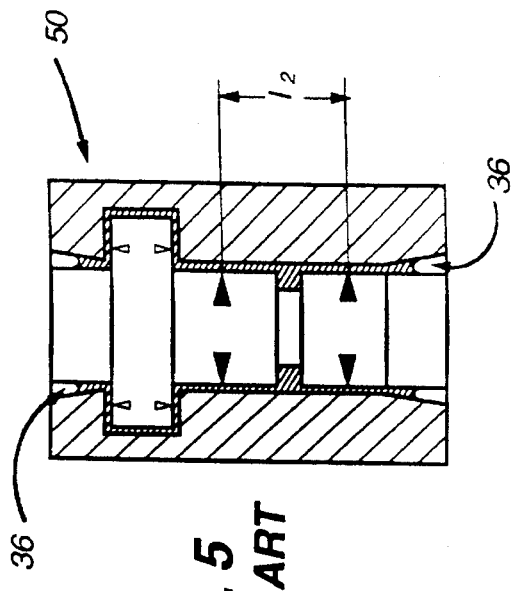
FIG. 4 is a simplified, cross-sectional, side elevational view of the hydrodynamic bearing of FIG. 1 indicating the distance between the bearing journals thereof as $l_1$.

With reference now to FIG. 4, a simplified illustration of the bearing 10 of FIG. 1 is shown, indicating the distance between the centers of forces acting on the bearing journals created by recess 20 as $l_1$. In the ensuing description, the simplified bearing designs of each of FIGS. 4–7 are all illustrated to the same scale (with respect to diameters and lengths) to allow comparison of the distances between bearing journals for each design and the centers of journal force are shown with black arrow heads. The journal and thrust bearings (or "surfaces") for each configuration are also the same size for comparative purposes. Moreover, like structure to that described with respect to FIGS. 1–3 is like numbered and the foregoing description thereof shall suffice herefor.

The distance between the centers of force acting upon the upper and lower bearing journals illustrated with respect to the hydrodynamic bearing designs of FIGS. 4–7 is directly related to tilt stiffness ($K_\theta$) by the equation:

$$K_\theta = \frac{1}{2}kl^2$$

where k, the journal stiffness, is a constant and $\theta$ is the angular tilt of the rotational axis between the upper and lower bearing journals.

Figure 5:
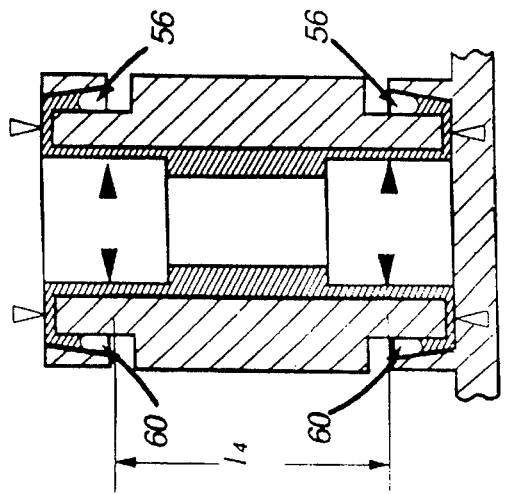
FIG. 5 is a comparative, cross-sectional, side elevational view of a simplified diagram of another hydrodynamic bearing design utilizing a similar surface tension seal orientation as the bearing of FIG. 1 indicating the corresponding distance between the bearing journals as $l_2$.

With reference additionally now to FIG. 5, a simplified diagram of another conventional hydrodynamic bearing 50 having a surface tension seal orientation similar to that utilized in the bearing 10 of FIG. 1 is shown. As can be seen, the distance between the centers of the journal force, herein designated as $l_2$, is even shorter than the distance $l_2$ in the hydrodynamic bearing 10 of FIG. 4 resulting in even lessened tilt stiffness.

Figure 6:
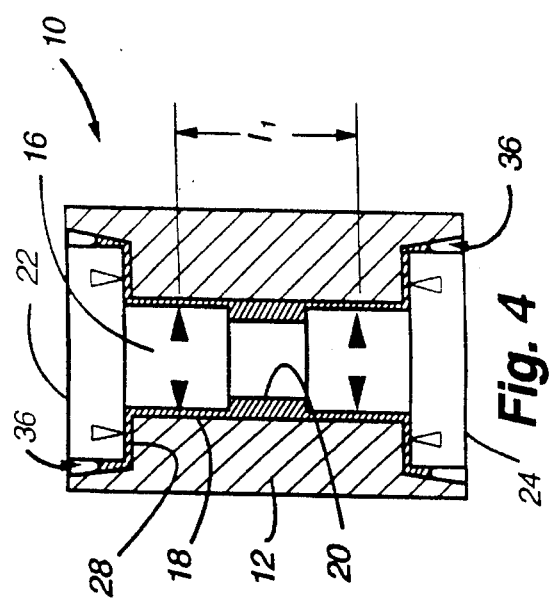
FIG. 6 is a corresponding, simplified cross-sectional, side elevational view of a bearing having a single inverted surface tension seal in accordance with a particular embodiment of the present invention and having a spacing between the bearing journals defined as $l_3$.

Referring now to FIG. 6, a simplified diagram of a bearing 52 having one inverted surface tension seal in accordance with a particular embodiment of the present invention is shown. Lower seal 60 has been inverted simply by bringing the clearance space 56 back in axially towards the center of the bearing 52 rather than extending it axially outward as with the corresponding clearance spaces 36 shown in the design of FIGS. 4 and 5. The result is that the distance between the centers of journal force, $l_3$, is on the order of 80 percent longer than $l_2$, the distance in FIG. 5, resulting in a 224 percent increase in tilt stiffness $K_\theta$.

Figure 7:
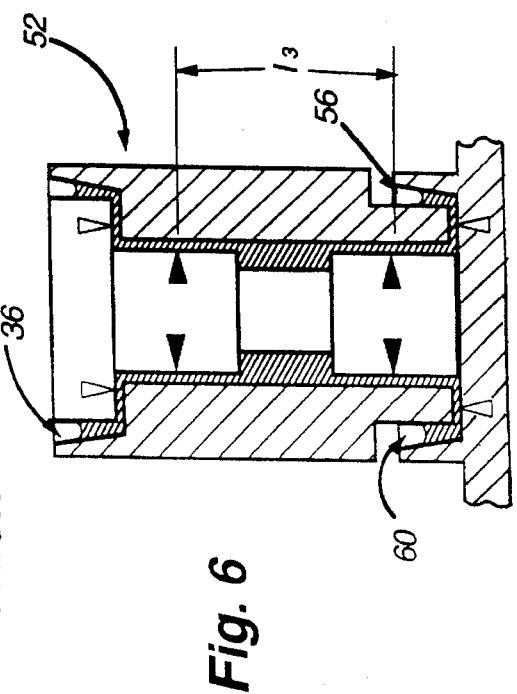
FIG. 7 is an additional, simplified cross-sectional, side elevational view of a bearing having two inverted surface tension seals in accordance with an additional embodiment of the present invention and having a spacing between the bearing journals defined as $l_4$.

With further reference to FIG. 7, a simplified diagram of an additional bearing 54 having two inverted surface tension seals in accordance with an additional embodiment of the present invention is shown. Both clearance spaces 56 now extend axially inward toward the center of bearing 54 rather than axially outward as with the corresponding clearance spaces 36 of the bearings of FIGS. 4–5. The result is that the distance between the centers of journal force $l_4$ is on the order of 120 percent longer than $l_2$, the distance indicated in FIG. 5. The resultant tilt stiffness $K_\theta$ of the bearing 54 design shown in FIG. 7 is thus approximately 384 percent greater than the tilt stiffness $K_\theta$ for the bearing 50 in shown in FIG. 5.

Figure 8:
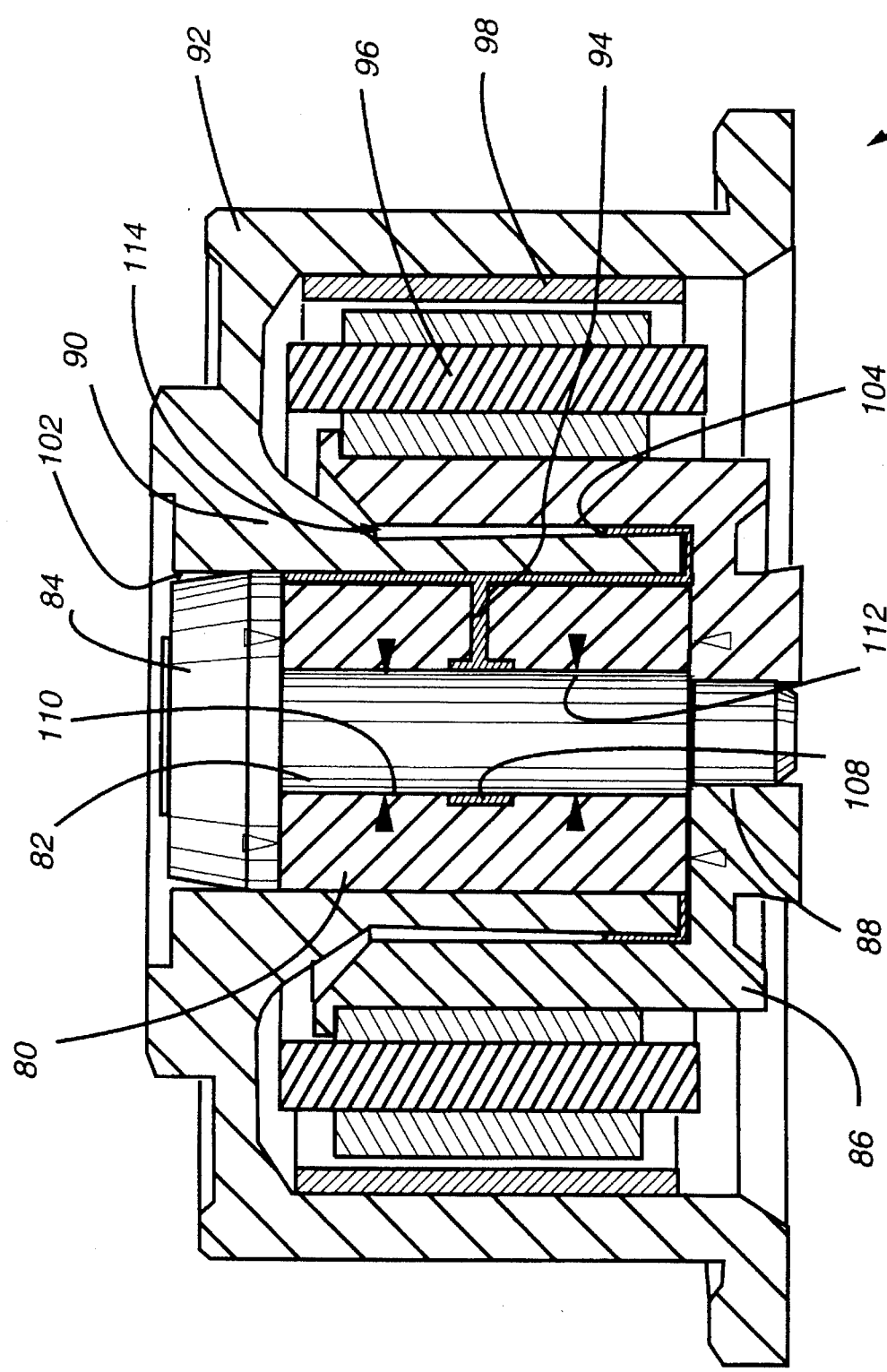
FIG. 8 is a detailed, cross-sectional, side elevational view of a hydrodynamic bearing design in accordance with the present invention having a single, lower inverted surface tension seal.

Referring now to FIG. 8, a detailed, cross-sectional, side elevational view of a particular embodiment of a hydrodynamic bearing 100 having a single inverted surface tension seal is shown corresponding most directly to the simplified illustration of FIG. 6. The main components of bearing 100 are as follows: A shaft 82 is constrained within a bushing 80 which may be rotated therearound. Thrust plates 84 and 86 are coupled to the shaft 82. The sleeve 90 is rigidly connected to the bushing 80 and a hub 92 which may be rotated about the stationary shaft 82 and thrust plates 84 and 86 forming an assembly which may be utilized as a disk drive spindle bearing assembly. A motor coil 96 and corresponding magnet 98 provide one possible means for rotating the spindle assembly. Details of the construction of the hydrodynamic bearing 100 surface tension seals 102 and 104 are briefly summarized in the paragraphs below.

The bushing 80 may be inscribed with pressure inducing patterns (not shown) as taught in the aforementioned patents for the bearing journals and the upper and lower thrust plates 84, 86. Moreover, it may also include, or partially include, pressure equalization ports such as port 94 shown as a radial hole and an axial slot in FIG. 8. Bushing 80 may also include, or partially include, a relief 108 defining or separating the two bearing journals 110 and 112. The bushing 80 may be rigidly connected to sleeve 90, for example by being heat shrunk, pressed, or bonded to the sleeve 90, or may be formed as an integral part of the sleeve 90.

The upper and lower thrust plates 84 and 86 are coupled to the shaft 82, for example by being heat shrunk, pressed, or bonded to shaft 82, or may be formed as an integral part of shaft 82. Reference number 88 indicates the static seal between the shaft 82 and thrust plate 86 which may be created by attaching the two parts by means of heat shrinking, and/or pressing and/or bonding.

Alternatively, the shaft 82 may be inscribed with the appropriate pressure inducing patterns (not shown) for the bearing journals 110, 112 instead of the bushing 80. The shaft 82 may further include, or partially include, a relief (not shown) defining or separating the two bearing journals 110, 112 in lieu of otherwise defining one in the bushing 80 as relief 108. The shaft 82 may further include the necessary structural elements (not shown) for attachment thereof to the base and/or cover of the HDA of a disk drive (not shown) by means of screws or other known attachment techniques. Alternatively, the thrust plates 84 and/or 86 may contain the structure necessary to attach the same to the base and/or cover of the disk drive HDA (not shown) as well as the pressure inducing patterns for the thrusts. As shown, the thrust plate 86 preferably includes structure for allowing rotation by a motor coil 96 and magnet 98, or other rotation means.

The hub 92 preferably includes structure (described hereinafter) for attaching recording media, such as one or more computer mass storage disks thereto. The sleeve 90 may be rigidly connected to the hub 92, for example by being heat shrunk, pressed, or bonded thereto, or may be formed as an integral part of the hub 92. The sleeve 90 may contain or partially contain one or more pressure equalization port(s) in addition to the pressure equalization port 94 formed in the bushing 80.

As shown, a conventional surface tension seal 102 is formed between sleeve 90 and the upper thrust plate 84. Its specific structure and function is as described in the aforementioned United States Patents incorporated by reference herein.

An inverted surface tension seal 104 formed in conjunction with the lower thrust plate 86 allows for an increased distance between the centers of force acting at the upper and lower journals 110, 112 as previously described thus resulting in an increased bearing 100 tilt stiffness. The inverted surface tension seal 104 is, in the embodiment shown, formed between the sleeve 90 and the lower thrust plate 86.

The hydrodynamic bearing 100 disclosed herein comprises a longitudinally extending sleeve 90 and bushing 80 and an elongated shaft 82 having first and second ends thereof, with the shaft 82 being disposed within the sleeve 90 and bushing 80 for rotation relative thereto. A first thrust plate 86 is coupled to the first end of the shaft and a second thrust plate 84 is coupled to the second end of the shaft 82. A lubricant is disposed between the shaft 82 and the sleeve 90 and bushing 80 and between the first and second thrust plates 86, 84 and the sleeve 90. The first thrust plate 86 extends radially outward adjoining a corresponding first end of the sleeve 90 forming a gap for containing the lubricant therebetween and the first thrust plate 86 further extends axially inward toward a center of the bearing 100 along an outer surface of the sleeve 90 forming a surface tension seal forming gap 114 therebetween. In a particular embodiment, the surface tension seal forming gap 114 may be a tapered gap which grows wider as it extends axially inward toward the center of the bearing 100 to form a surface tension seal 104. Alternatively, the surface tension seal forming gap 114 may be of a linear or non-linear gap width other than a tapered gap and still provide a surface tension seal forming gap in accordance with the present invention.

Figure 9:
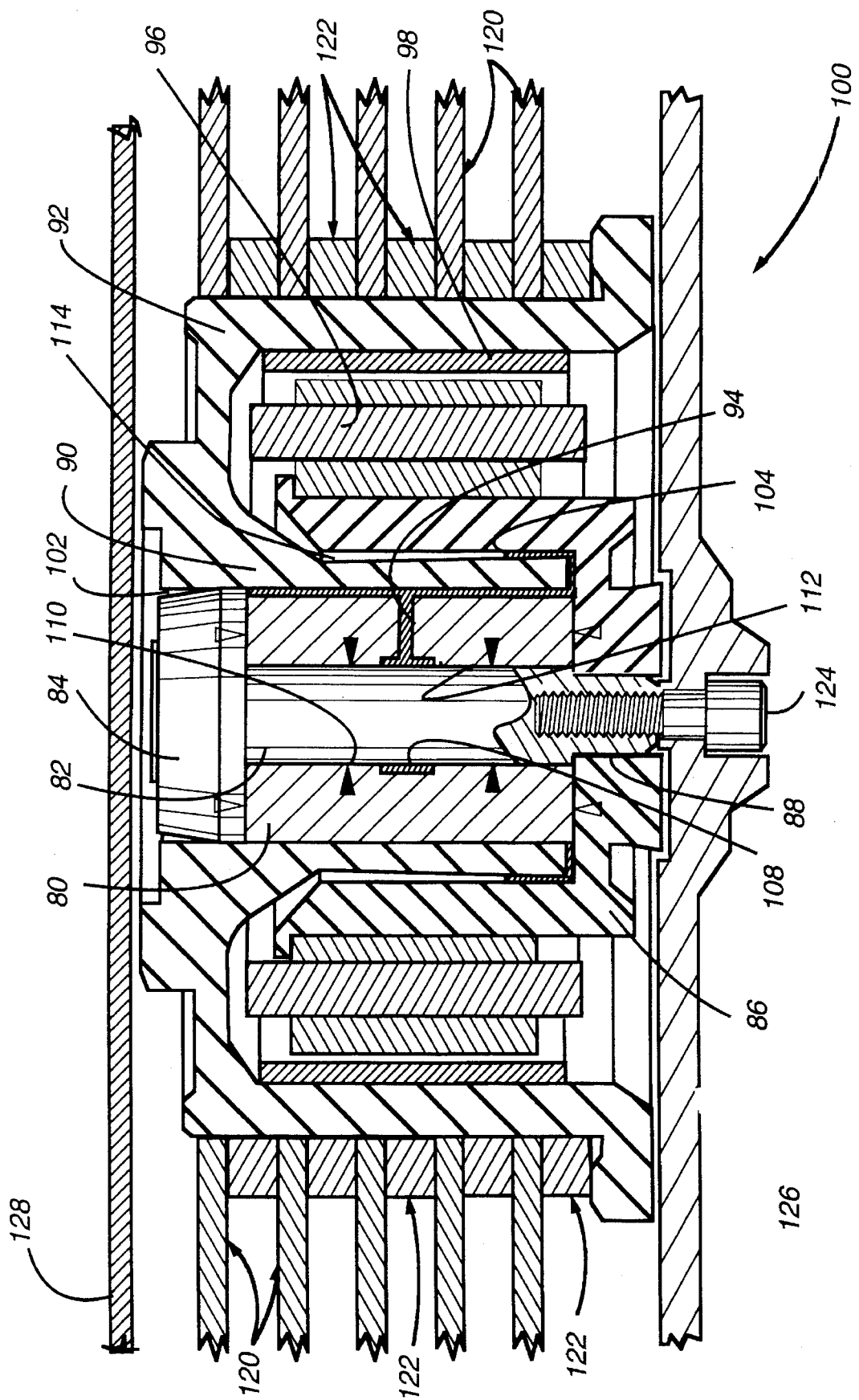
FIG. 9 is an additional, detailed, cross-sectional, side elevational view of the hydrodynamic bearing of FIG. 8 utilized in conjunction with the spindle motor of a disk drive and showing the central shaft thereof secured to the drive baseplate, for example, in a cantilevered mounting configuration without attachment to the head disk assembly ("HDA") cover.

With reference now to FIG. 9, the hydrodynamic bearing 100 of FIG. 8 is shown in conjunction with a disk drive spindle motor comprising the motor coil 96 and magnet 98 previously described. With reference to the embodiment of FIG. 9, like structure to that above described with respect to the preceding figures is like numbered and the foregoing description thereof shall suffice herefor.

An arbitrary number of disks 120 may be affixed at their ID to the periphery of the hub 92 separated by spacers 122 in the utilization of the hydrodynamic bearing 100 as a disk drive spindle bearing assembly. The shaft 82 is shown as being rigidly affixed by means of a screw 124 at a lower end thereof to the HDA baseplate 126 in, for example only, a cantilevered configuration wherein the opposite end of the shaft 82 adjacent the upper thrust plate 84 is not affixed to the HDA cover 128. The enhanced tilt stiffness characteristics of the hydrodynamic bearing 100 render it particularly well suited for use in a cantilevered configuration as shown. Nevertheless, the hydrodynamic bearing 100 having one or more inverted surface tension seals disclosed herein may also be utilized in a configuration wherein the spindle bearing assembly is affixed to both the baseplate 126 and cover 128 of the HDA.

While the exemplary preferred embodiments of the present invention are described herein with particularity, those having normal skill in the art will recognize various changes, modifications, additions and applications other than those specifically mentioned herein without departing from the spirit of this invention. For example, conical or spherical bearings, which provide both axial and radial support, may be incorporated instead of the conventional journal/thrust combinations described.

What is claimed is:

1. A hydrodynamic bearing comprising:

a longitudinally extending sleeve;

an elongated shaft having first and second ends thereof, said sleeve axially surrounding said shaft for rotation relative thereto;

a first thrust plate coupled to said first end of said shaft;

a second thrust plate coupled to said second end of said shaft;

a lubricant disposed between said shaft and said sleeve and between said first and second thrust plates and said sleeve;

said first thrust plate extending radially outward adjoining a corresponding first end of said sleeve forming a gap for containing said lubricant therebetween, said first thrust plate further extending axially inward toward a center of said bearing along an outer surface of said sleeve defining a surface tension seal forming gap therebetween, said lubricant disposed within said surface tension seal forming gap providing a surface tension seal.

2. The hydrodynamic bearing of claim 1 wherein said shaft comprises lubricant pressure inducing patterns formed thereon.

3. The hydrodynamic bearing of claim 1 wherein said sleeve further comprises a bushing coupled to said sleeve axially surrounding said shaft.

4. The hydrodynamic bearing of claim 3 wherein said bushing comprises lubricant pressure inducing patterns formed thereon.

5. The hydrodynamic bearing of claim 3 wherein said bushing further comprises at least one pressure equalization port.

6. The hydrodynamic bearing of claim 3 wherein said bushing is pressed into said sleeve.

7. The hydrodynamic bearing of claim 3 wherein said bushing is heat shrunk into said sleeve.

8. The hydrodynamic bearing of claim 3 wherein said bushing further comprises a relief for defining upper and lower journals along said shaft.

9. The hydrodynamic bearing of claim 1 wherein said shaft is coupled to said first and second thrust plates by pressing.

10. The hydrodynamic bearing of claim 1 wherein said shaft is coupled to said first and second thrust plates by heat shrinking.

11. The hydrodynamic bearing of claim 1 wherein said first and second thrust plates are integrally formed with said shaft.

12. The hydrodynamic bearing of claim 1 wherein said sleeve further comprises at least one pressure equalization port.

13. The hydrodynamic bearing of claim 1 wherein said sleeve further comprises a hub circumferentially surrounding and coupled to said sleeve.

14. The hydrodynamic bearing of claim 13 wherein said hub is heat shrunk to said sleeve.

15. The hydrodynamic bearing of claim 13 wherein said hub is pressed onto said sleeve.

16. The hydrodynamic bearing of claim 13 wherein said hub further comprises a spindle motor for rotating said hub and said sleeve with respect to said shaft and said first and second thrust plates.

17. The hydrodynamic bearing of claim 13 wherein said hub further comprises at least one computer mass storage disk affixed thereto.

18. The hydrodynamic bearing of claim 1 wherein said second thrust plate further extends radially outward along said second end of said sleeve forming a gap for containing said lubricant therebetween, said second thrust plate also extending axially inward toward a center of said bearing along an outer surface of said sleeve defining an additional surface tension seal forming gap therebetween, said lubricant disposed within said additional surface tension seal forming gap forming a surface tension seal.

19. An improved hydrodynamic bearing of the type having a rotating shaft disposed within a sleeve, a first thrust plate coupled to a first end of said shaft, a second thrust plate coupled to a second end of said shaft and a lubricant disposed between said sleeve and said shaft and between said sleeve and said thrust plates, wherein the improvement, in combination, comprises:

said first thrust plate extending radially outward along said first end of said sleeve forming a gap for containing said lubricant therebetween, said first thrust plate also extending axially inward toward a center of said bearing along an outer surface of said sleeve defining a surface tension seal forming gap therebetween, said surface tension seal forming gap growing wider as it extends axially inward toward said center of said bearing to form a surface tension seal.

20. The hydrodynamic bearing of claim 19 wherein said shaft comprises lubricant pressure inducing patterns formed thereon.

21. The hydrodynamic bearing of claim 19 wherein said sleeve further comprises a bushing coupled to said sleeve axially surrounding said shaft.

22. The hydrodynamic bearing of claim 21 wherein said bushing comprises lubricant pressure inducing patterns formed thereon.

23. The hydrodynamic bearing of claim 21 wherein said bushing further comprises at least one pressure equalization port.

24. The hydrodynamic bearing of claim 21 wherein said bushing is pressed into said sleeve.

25. The hydrodynamic bearing of claim 21 wherein said bushing is heat shrunk into said sleeve.

26. The hydrodynamic bearing of claim 21 wherein said bushing further comprises a relief for defining upper and lower journals along said shaft.

27. The hydrodynamic bearing of claim 19 wherein said shaft is coupled to said first and second thrust plates by pressing.

28. The hydrodynamic bearing of claim 19 wherein said shaft is coupled to said first and second thrust plates by heat shrinking.

29. The hydrodynamic bearing of claim 19 wherein said first and second thrust plates are integrally formed with said shaft.

30. The hydrodynamic bearing of claim 19 wherein said sleeve further comprises at least one pressure equalization port.

31. The hydrodynamic bearing of claim 19 wherein said sleeve further comprises a hub circumferentially surrounding and coupled to said sleeve.

32. The hydrodynamic bearing of claim 31 wherein said hub is heat shrunk to said sleeve.

33. The hydrodynamic bearing of claim 31 wherein said hub is pressed onto said sleeve.

34. The hydrodynamic bearing of claim 31 wherein said hub further comprises a spindle motor for rotating said hub and said sleeve with respect to said shaft and said first and second thrust plates.

35. The hydrodynamic bearing of claim 31 wherein said hub further comprises at least one computer mass storage disk affixed thereto.

36. The hydrodynamic bearing of claim 19 wherein said second thrust plate further extends radially outward along said second end of said sleeve forming a gap for containing said lubricant therebetween, said second thrust plate also extending axially inward toward a center of said bearing along an outer surface of said sleeve defining an additional surface tension seal forming gap therebetween, said surface tension seal forming gap growing wider as it extends axially inward toward said center of said bearing to form a surface tension seal.

37. A hydrodynamic bearing comprising:

a central shaft;

a sleeve having first and second ends and an inner and outer diameter thereof, said sleeve axially surrounding said central shaft at said inner diameter thereof;

at least one thrust plate coupled adjacent an end of said central shaft adjoining said first end of said sleeve, said thrust plate further presenting a portion thereof disposed adjoining said outer diameter of said sleeve extending toward said second end thereof to define a surface tension seal forming gap therebetween; and a lubricant disposed between said shaft and said inner diameter of said sleeve and between said first end of said sleeve and said thrust plate, said lubricant in said surface tension seal forming gap forming a surface tension seal.

38. The hydrodynamic bearing of claim 37 wherein said central shaft comprises lubricant pressure inducing patterns formed thereon.

39. The hydrodynamic bearing of claim 37 wherein said sleeve further comprises a bushing coupled to said sleeve at said inner diameter thereof for axially surrounding said central shaft.

40. The hydrodynamic bearing of claim 39 wherein said bushing comprises lubricant pressure inducing patterns formed thereon.

41. The hydrodynamic bearing of claim 39 wherein said bushing further comprises at least one pressure equalization port.

42. The hydrodynamic bearing of claim 39 wherein said bushing is pressed into said sleeve.

43. The hydrodynamic bearing of claim 39 wherein said bushing is heat shrunk into said sleeve.

44. The hydrodynamic bearing of claim 39 wherein said bushing further comprises a relief for defining upper and lower journals along said central shaft.

45. The hydrodynamic bearing of claim 37 wherein said central shaft is coupled to said thrust plate by pressing.

46. The hydrodynamic bearing of claim 37 wherein said central shaft is coupled to said thrust plate by heat shrinking.

47. The hydrodynamic bearing of claim 37 wherein said thrust plate is integrally formed with said central shaft.

48. The hydrodynamic bearing of claim 37 wherein said sleeve further comprises at least one pressure equalization port.

49. The hydrodynamic bearing of claim 37 wherein said sleeve further comprises a hub circumferentially surrounding and coupled to said sleeve.

50. The hydrodynamic bearing of claim 49 wherein said hub is heat shrunk to said sleeve.

51. The hydrodynamic bearing of claim 49 wherein said hub is pressed onto said sleeve.

52. The hydrodynamic bearing of claim 49 wherein said hub further comprises a spindle motor for rotating said hub and said sleeve with respect to said central shaft and said thrust plate.

53. The hydrodynamic bearing of claim 49 wherein said hub further comprises at least one computer mass storage disk affixed thereto.

54. The hydrodynamic bearing of claim 37 further comprising an additional thrust plate coupled adjacent an opposite end of said central shaft adjoining said second end of said sleeve, said additional thrust plate further presenting a portion thereof disposed adjoining said outer diameter of said sleeve extending toward said first end thereof to define an additional surface tension seal forming gap therebetween, said lubricant further being interposed between said second end of said sleeve and said additional thrust plate and said lubricant in said additional tapered gap forming an additional surface tension seal.

* * * * *